R. T. KNIGHT.
Paper Drier.
No. 63,259.
Patented March 26, 1867.
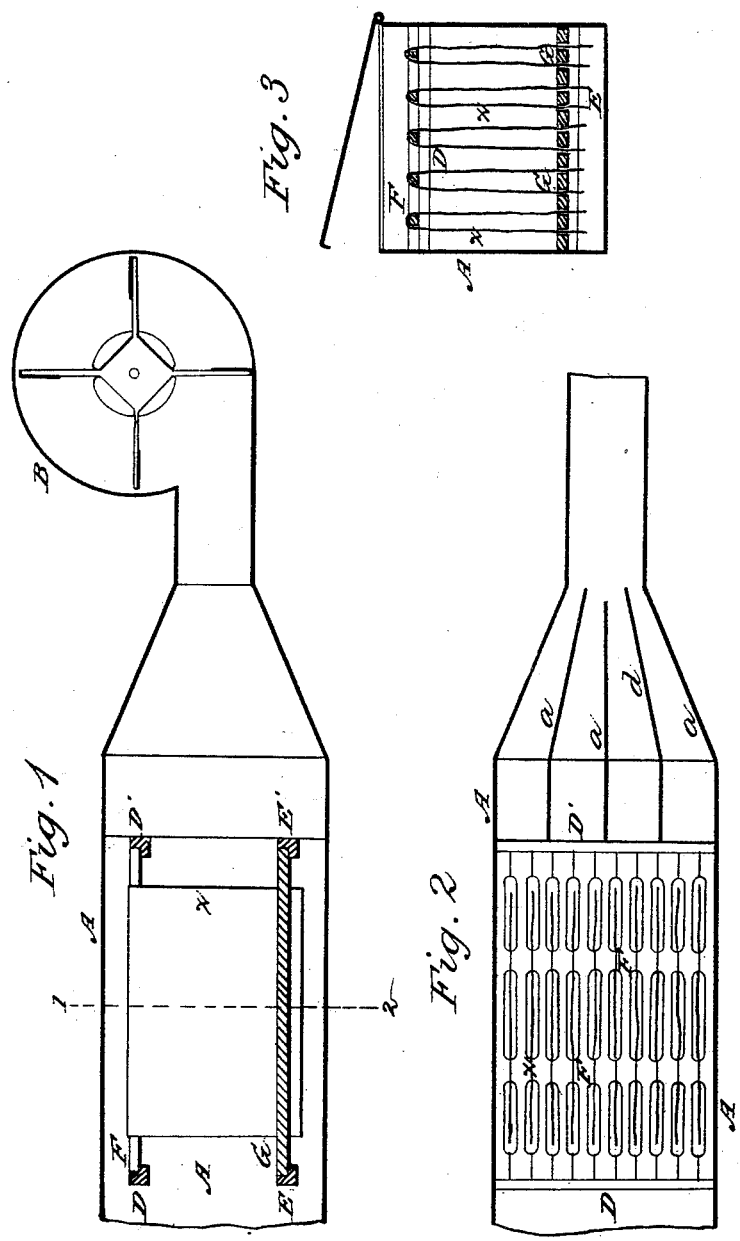
Witnesses:
Inventor:

United States Patent Office.

ROBERT T. KNIGHT, OF PHILADELPHIA, PENNSYLVANIA.

*Letters Patent No. 63,259, dated March 26, 1867.*

IMPROVED APPARATUS FOR DRYING STRAW BOARD, SHEETS OF PAPER, &c.

*The Schedule referred to in these Letters Patent and making part of the same.*

TO ALL WHOM IT MAY CONCERN:

Be it known that I, ROBERT T. KNIGHT, of Philadelphia, Pennsylvania, have invented an Apparatus for Drying Straw Boards, &c.; and I do hereby declare the following to be a full, clear, and exact description of the same, reference being had to the accompanying drawing, and to the letters of reference marked thereon.

My invention consists of an apparatus, fully described hereafter, whereby straw boards, paper, &c., may be more quickly and readily dried than heretofore.

In order to enable others skilled in the art to make and use my invention, I will now proceed to describe its construction and operation, reference being had to the accompanying drawing, which forms a part of this specification, and in which—

Figure 1 is a vertical section of my apparatus for drying straw board, sheets of paper, &c.

Figure 2, a sectional plan; and

Figure 3, a transverse section on the line 1–2, fig. 1.

A represents a portion of a long rectangular chamber, communicating at one end with an ordinary fan, B, the blast from which is caused to pass through several passages formed by plates $a$, fig. 2, so as to be well distributed laterally as it enters the chamber A. Within this chamber are two upper cross-bars, D and D', and two lower cross-bars, E and E'. In recesses made in the former rest a number of plain slats, F, and in recesses formed in the cross-bars E and E' rest a number of slats, G, which are made wider at some points than at others, as seen in fig. 2, so that although the slats are nearly in contact with each other at some points, they are wide enough apart at others to permit the blast to pass freely between them. The chamber may be of any desired length, and the above system of cross-bars and slats may be repeated at appropriate intervals. On the top of the chamber, however, should be doors, on opening which access may be had to each system of slats. Hitherto it has been usual to dry straw boards by bringing them in contact with heated cylinders, or by hanging them in rooms into which air is permitted to enter freely. The time consumed, however, in this, the old mode of drying, is such as to render the process tedious and costly, as well as uncertain, owing to different temperatures of the air. My invention has been designed to overcome these objections.

A straw board, $x$, in its wet state is placed over each of the slats F, the two folds hanging down, extending nearly to the bottom of the chamber A, and passing between lower slats, as seen in fig. 3. After the whole of the slats have been thus furnished with wet straw boards, the doors of the chamber are closed and the fan is caused to revolve, so as to force through the chamber a continuous blast, to which are subjected all sides of the several straw boards, the latter not being disturbed by the blast, as the folds are held between the lower slats. The air forced through the chamber may be of any temperature which may be found best for rapid drying effect without injuring the boards. An exhaust-fan may be situated at one end of the chamber, so as to cause a rush of air into the opposite end, or the blast may be produced by apparatus other than a fan. After the straw boards have been thus rapidly dried, they are removed with the upper slats F, the latter refurnished with wet boards, and again deposited in the chamber preparatory to being dried in the manner described above. The chamber may be of sufficient dimensions to permit the ingress and egress of attendants in removing and replacing the slats, and the system of slats may be arranged in tiers, or the chamber may be vertical and extend from story to story of a building, and made accessible from different floors.

Without confining myself, therefore, to any particular form or arrangement of chamber, I claim as my invention, and desire to secure by Letters Patent—

1. A chamber communicating with a fan or other blowing or exhausting apparatus, and having any desired number of bars, D, D', or their equivalents, for the reception of detachable slats, F, or their equivalents.

2. The construction and arrangement, substantially as described, of the lower slats G, for the purpose specified.

In testimony whereof I have signed my name to this specification in the presence of two subscribing witnesses.

ROBERT T. KNIGHT.

Witnesses:
CHARLES E. FOSTER,
W. J. R. DELANY.